United States Patent Office 3,448,073
Patented June 3, 1969

3,448,073
VINYL POLYMERIZATION PROCESS
Robert J. McManimie, Glendale, Mo., assignor to Monsanto Company, St. Louis, Mo., a corporation of Delaware
No Drawing. Filed Feb. 17, 1966, Ser. No. 528,089
Int. Cl. C08f 1/62, 3/68, 15/40
U.S. Cl. 260—41         12 Claims This invention relates to a process for polymerizing ethylenically unsaturated monomers by a free radical polymerization. One aspect of this invention relates to the use of a novel accelerator system which can be used in conjunction with the polymerization catalyst to control the speed of a vinyl polymerization.

A polymerization accelerator can be an important component in a polymerization system. Some catalysts capable of producing resins with many desirable attributes are such sluggish catalysts in terms of polymerization time required that their use is impractical without an accompanying accelerator. Other polymerizations can simply be made more economically attractive by acceleration to reduce total residence time in a mold or reactor. Still other polymerizations are conducted in the presence of such sensitive catalysts that extreme care over long periods of time is required to produce an acceptable product. Substitution of an insensitive catalyst together with an accelerator can provide a smoother reaction resulting in a comparable product in a shorter time. For instance, one conventional process for casting ¼ inch thick acrylic sheet requires about 20 to 24 hours' polymerization time to produce a clear, bubble-free article. For acrylic sheet thicker than 0.5 inch, the casting procedure is also conducted at superatmospheric pressures. Extreme care and carefully controlled conditions are required to produce a cast acrylic sheet free from bubbles and voids. Such care is necessitated by the fact that at certain stages of the polymerization of acrylic resins, the evolution of large amounts of heat occurs, even though the application of a certain amount of heat is desirable at the onset and at the end of the polymerization to reduce the total curing time. In a casting polymerization of acrylic sheet, the polymerization proceeds slowly at first and is accelerated by the application of heat. The monomer is of low viscosity and chain termination and initiation are balanced. As the polymerizing monomer reaches the gel stage, chain termination is diminished and the internal temperature rises sharply, thereby accelerating the polymerization even more and causing the evolution of even more heat. If the exotherm is not controlled, the heat build-up can cause the monomer to boil, thus producing a sheet full of bubbles and disfigurations, or even worse, the reaction may reach the point of explosive violence resulting in damage to the molds and other items of value. If the exotherm is controlled and the system is brought to substantial completion without damage to the casting, heat is again applied to polymerize the remaining 3 or 4% residual monomer. A typical procedure for casting a ⅛ or 3/16 inch sheet of polymethyl methacrylate comprises adding 0.5% benzoyl peroxide to the uninhibited monomer and heating the mixture with agitation to about 90° C. for eight to ten minutes, followed by rapid cooling to room temperature. The prepolymer so formed can then be treated with plasticizers, fillers, dyes, pigments, stabilizers and the like, after which time the prepolymer is deaerated and either refrigerated or used immediately. When ready for casting, a flat sheet mold is filled with the prepolymer syrup and placed in an oven at 42° C. for 12 to 18 hours after which time the sheet is heated to 95 to 98° C. over a one hour period and held at this temperature for an additional 30 minutes. Despite the production costs connected with such a manufacturing process the demand for cast acrylic sheet has continued to increase. The clarity, brilliance, and almost gem-like quality of cast acrylics have done much to convince the public that plastics are not cheap substitutes but new materials with a new scope of uses.

The acrylics are also useful in a variety of applications utilizing some of their physical and mechanical properties other than clarity such as weather resistance, good tensile properties and impact strength. Some applications for translucent or opaque acrylics include outdoor advertising displays, exterior and interior wall cladding, room dividers, shower enclosures and doors.

As is apparent from the description above, the need in the polymerization casting of acrylic sheet is not for an accelerator to speed the reaction since this would result in a reaction even more difficult to control. Rather the need is for some sort of catalyst system which is capable of regulating the polymerization—speeding it up in its initial and final stages and slowing it down during its intermediate stage. Paradoxically, the above need can be satisfied by proper choice of an accelerator in combination with the proper catalyst.

Presently, there are available accelerator-catalyst systems which can regulate an acrylic bulk polymerization in acceptable fashion producing a satisfactory article in 2 to 6 hours as compared to 20 to 24 hours using conventional peroxide catalysis. Many such systems which perform satisfactorily in the laboratory are nevertheless not adaptable to the most efficient practices of commercial production. For instance, a rapid process for casting acrylic sheet could be efficiently implemented on a large volume continuous basis by holding a pre-accelerated and catalyzed monomer for some indefinite period of time in an unpolymerized state and subsequently introducing it into an apparatus where it can be polymerized on a continuous basis. The rapid process could be even more efficiently and economically implemented if the catalyzed monomer could be maintained in an unpolymerized state without the necessity for extraordinary precautions. To accomplish this objective, the accelerator-catalyst system should be stable at room temperature or slightly above, and should also be unaffected by air and moisture.

In view of the foregoing problems and suggested solutions, it would be highly advantageous to devise an accelerator-catalyst system for an acrylic bulk polymerization which can effect a complete polymerization of an acceptable article in a relatively short period of time. It would be additionally advantageous if the acrylic monomer could remain unaffected by the accelerator-catalyst system for prolonged periods of time. It would also be advantageous if the accelerator-catalyzed monomer could be maintained in the unpolymerized state at room temperature and in the presence of air and moisture. Providing an accelerator-catalyst system which can perform in the above-described manner constitutes the principal object of this invention. It is a further object of this invention to provide an accelerator for any polymerization which is catalyzed by a free radical mechanism, whether it be a bulk, suspension, emulsion, solution or other type of polymerization. Additional objects, benefits and advantages will become apparent as the detailed description of the invention proceeds.

The present invention is directed to a process for polymerizing ethylenically unsaturated monomers by a free radical mechanism comprising:

(a) Mixing together an ethylenically unsaturated monmer capable of free radical polymerization, a polymerization catalyst capable of decomposing to form free radicals, and an accelerator substance capable of decomposing to release sulfur dioxide, (b) Releasing sulfur dioxide from said accelerator substance and thereby accelerating the formation of free radicals from said polymerization catalyst, and (c) Polymerizing said ethylenically unsaturated monomer in the presence of said free radicals.

Monomers capable of being polymerized in an accelerated free radical polymerization of the type described above include a wide variety of ethylenically unsaturated monomers, i.e. chemical compounds having a $>C=C<$ group within the molecule. One suitable class of compounds is the monoolefins ethylene and propylene. Another class is the diolefins such as butadiene and isoprene. Still another class of suitable monomers is the class popularly referred to as the vinyl monomers, examples being vinyl chloride, vinyl fluoride, vinyl acetate, vinyl stearate, vinyl alcohol, vinyl ethers such as vinyl isobutyl ether and vinyl methyl ether, vinylidene chloride, vinylidene fluoride, methyl vinyl ketone, vinyl butyral, vinyl formal, tetrafluoroethylene and trichlorofluoroethylene and the closely related class of allyl and higher alkenyl monomers such as allyl chloride, allyl acetate and the like. Styrene, substituted styrenes such as α-methyl styrene, and the ring-substituted styrenes such as vinyl toluene form another class of monomers suitable for use herein. Closely related to the styrene monomers are the heterocyclic ring-substituted vinyl compounds such as vinyl pyridine and 5-methyl-2-vinyl pyridine and the condensed ring-substituted vinyl compounds such as vinyl naphthalene. The accelerator-catalyst system described herein is particularly useful in the polymerization of acrylic monomers such as arcylonitrile, methacrylonitrile, alkyl acrylates and methacrylates such as methyl acrylate, methyl methacrylate, ethyl methacrylate, lauryl methacrylate and stearyl acrylate, acrylic and methacrylic acids, chloroethyl methacrylate, cyclohexyl acrylate and methoxymethyl methacrylate. In addition to homopolymers of the above monomers, the present invention also includes within its scope the copolymerization, terpolymerization and higher interpolymerization of the above or similar monomers with one another or with other monomers which cannot be readily homopolymerized by a free radical addition mechanism. Examples of monomers interpolymerizable by a free radical mechanism with some of the monomers set forth above include maleic anhydride, diethyl maleate, dimethyl fumarate and vinyloxyethanol. A further modification in the monomer system to be polymerized can be the dilution of the monomer in a quantity of polymer identical to that to be formed by polymerization of monomer. For instance, polymethyl methacrylate can be dissolved in monomeric methyl methacrylate. The resultant syrup can be polymerized into a solid shape more smoothly and readily than can the undiluted monomer.

The instant accelerator-catalyst system can be used to conduct a free radical polymerization in bulk, emulsion, suspension or solution. Conditions of temperature, pressure and time will vary considerably, depending upon the particular monomers being polymerized, upon the choice of polymerization system, and upon the interdependence of the variables themselves. Generally, those skilled in the art will recognize that the present invention reduces the time required for any free radical polymerization under conditions of temperature and pressure comparable to the conditions employed in an unaccelerated polymerization. Alternatively, if equivalent time of polymerization is permitted, the accelerated polymerization can be conducted at a lower temperature or pressure or both than can the unaccelerated polymerization. Specific reaction conditions can be ascertained by reference to prior art free radical polymerizations, bearing in mind the effect of the accelerator upon the reaction.

As catalysts for inducing the polymerization reaction there can be used any compounds which will generate free radicals under the reaction conditions. Specific classes of compounds which can be used include peroxides such as di-acetyl peroxide, acetyl benzoyl peroxide, dipropionyl peroxide, dilauryoyl peroxide, benzoyl peroxide, dimethyl peroxide, diethyl peroxide, dipropyl peroxide, tetralin peroxide, cyclohexane peroxide, acetone peroxide; hydroperoxides such as cyclohexyl hydroperoxide, cumene hydroperoxide, t-butyl hydroperoxide and methyl cyclohexyl hydroperoxide; hydrazine derivatives such as hydrazine hydrochloride, hydrazine sulfate, dibenzoylhydrazine, diacetylhydrazine and trimethylhydrazinium iodide; amine oxides such as pyridine oxide, trimethylamine oxide and dimethylaniline oxide; alkali metal and ammonium persulfates, perborates, and percarbonates; compounds containing the group $>C=N-$ and derived from ketaldones, i.e., a ketone or aldehyde, such as the azines (containing the group $>C=N-N=C<$), benzalazine, heptaldazine and diphenylketazine, oximes (containing the group $>C=NOH$) such as d-camphor oximes, acetone oxime, alpha - benzil dioxime, butyraldoxime, alpha - benzoin oxime and dimethylglyoxime; hydrazones (containing the group $>C=N-N<$) such as benzaldehyde phenylhydrazones, phenylhydrazones of cyclohexanone, cyclopentanone, acetophenone, methone, camphor, and benzophenone; semicarbazones (containing the group $$>C=N-NHCONH_2)$$

such as semicarbazones of acetone, methyl ethyl ketone, diethyl ketone biacetyl, cyclopentanone, cyclohexanone, acetophenone, propiophenone, camphor and benzophenone; Schiff's bases (containing the group $>C=N-$) such as benzalaniline, benzal-p-toluidine, benzal-o-toluidine, benzaldehyde derivatives of methylamine, ethylamine and heptylamine; anils and analogous compounds of other amines, such as acetaldehyde anil, isobutyraldehyde anil, hepaldehyde anil, etc.; oxygen; and the reaction products of organometallics such as cadmium alkyl, zinc alkyl, tetraethyl lead, aluminum alkyl, etc. with oxygen.

When acrylic monomers such as methyl methacrylate are being cast into sheet form via bulk polymerization, one particularly preferred group of free radical catalysts are the hydroperoxides. The hydroperoxy compounds do not decompose readily upon the application of heat but do decompose readily when contacted with sulfur dioxide. For these reasons, they are one preferred component of the novel accelerator-catalyst system being described herein.

Those catalysts suggested above are generally used in amounts from about 0.001% to 0.5% by weight based on the total reactants. While it is generally not necessary, for attaining extremely high rates of reaction or for other special purposes, even higher amounts of catalysts may be used; for example, amounts ranging up to as high as 1% or even 5% as an upper limit can be employed.

Accelerators within the scope of the present invention are those substances which are capable of releasing sulfur dioxide upon decomposition of the substance. The term *decomposition* should be construed broadly to include any change in the sulfur dioxide-containing substance which results in the release of free sulfur dioxide. For instance, sulfur dioxide can be adsorbed onto a molecular sieve and added to a catalyzed monomer or prepolymer system. Upon application of heat or some other technique to desorb the sulfur dioxide, the generation of free radicals by the catalyst will be accelerated by the action of the free sulfur dioxide upon the catalyst compound. The term *decomposition* as used herein included such a desorption reaction.

Preferred are those accelerator substances which are relatively stable and do not decompose spontaneously or almost spontaneously with but slight variations in temperature or pressure or in the presence of small quantities of moisture or air. Even though such sensitive substances can be used herein to advantage, they are not preferred for several reasons. For example, extra care must be exercised when it is desired to hold the catalyzed monomer in an unpolymerized state for any length of time if the accelerator substance is exceptionally unstable. Further, a too rapid release of sulfur dioxide during polymerization can cause a runaway reaction which could yield an unsatisfactory product. A substance capable of releasing sulfur dioxide gradually and at a controllable rate is highly preferred for use herein. If the release of sulfur dioxide can be controlled by externally manipulable reaction conditions such as temperature or pressure, so much the better; closer control of the sulfur dioxide release can be maintained.

It will be appreciated that several different accelerator substances can be used herein and that not every accelerator substance will be equally practicable for all free radical polymerizations. Examples of suitable accelerator substances which can be used in conjunction with a free radical catalyst include a number of inorganic salts which form definite addition compounds with sulfur dioxides. The adducts so formed correspond in type to hydrates and ammoniates with $SO_2$ groups substituted for $H_2O$ or $NH_3$ groups. As a rule, they dissociate readily at temperatures ranging from about 0 to 50° C. Molecular formulae of typical addition compounds include $NaI \cdot 4SO_2$, $KI \cdot 4SO_2$, $SrI_2 \cdot 4SO_2$, $BaI_2 \cdot 4SO_2$ $LiI \cdot 2SO_2$, $NaI \cdot 2SO_2$, $SrI_2 \cdot 2SO_2$, $BaI_2 \cdot 2SO_2$, $LiI \cdot SO_2$, $AlCl_3 \cdot SO_2$, $KSCN \cdot SO_2$, $KSCN \cdot \frac{1}{2}SO_2$, $RbSCN \cdot \frac{1}{2}SO_2$, $CsSCN \cdot \frac{1}{2}SO_2$ and $Ca(SCN)_2 \cdot \frac{1}{2}SO_2$. Another type of accelerator substance are those chemical compounds in which sulfur and oxygen are bonded to another moiety through chemical covalent bonds and which yield free sulfur dioxide upon disruption of the covalent bonds. Examples include 2,5-dihydrothiophene 1,1-dioxide (3-sulfolene), tetrahydrothiophene-1,1-dioxide (sulfolane), and other diene-sulfone adducts such as isoprene sulfone, hexadiene sulfone and cyclopentadiene sulfone. Another type of sulfur dioxide-releasing compound are inorganic sulfites and bisulfites such as sodium bisulfite, ammonium sulfite and titanium sulfite. A third type of accelerator substance are those materials having sulfur dioxide adsorbed on some adsorbent such as a molecular sieve. Examples of molecular sieves operable as adsorbents include those synthetic crystalline metal aluminosilicates belonging to a class of minerals known as zeolites. As synthesized, the crystals contain water of hydration which can be driven out by heating. Sulfur dioxide can then be adsorbed into the pores vacated by the water and can be held there until released by heating.

As previously mentioned, the accelerator substance must make available free sulfur dioxide for reaction with the catalyst if it is to function as an effective accelerator. As also mentioned, the sulfur dioxide can be liberated by the application of heat or withdrawal of pressure or by a chemical substitution reaction or by other means. The amount of accelerator substance is governed by the amount of free sulfur dioxide it is capable of generating. Generally, the amount of sulfur dioxide can vary from a very small quantity up to ten times the molecularly equivalent amount of catalyst. Even larger quantities of sulfur dioxide can be supplied but no appreciable benefit is obtained from the use of such excessive amounts. Usually a molar quantity ranging from 0.5 to about 5 times the molar quantity of catalyst is used.

To provide the greatest advantages in the use of the present invention, i.e. the ability to hold a catalyzed accelerated monomer slurry in an unpolymerized state for an indefinite time and then polymerize it rapidly and easily to produce an acceptable article, it is desirable that the catalyst be one which does not decompose spontaneously to any substantial extent at temperatures approximating the holding temperature. It is further desirable that the catalyst itself be relatively unaffected by the temperatures of polymerization but that it react readily with sulfur dioxide to yield free radicals at the temperature of polymerization. In the polymerization temperature range from about −20° to about 120° C., the organic hydroperoxides are particularly suitable catalysts for vinyl free radical polymerizations when combined with a suitable accelerator substance. Accelerator substances preferred for use with a hydroperoxide-catalyzed acrylic bulk polymerization are the diene sulfone adducts of the formula

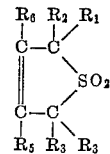

where the R's are hydrogen, alkyl, aryl or alkaryl groups, preferably having up to 8 carbon atoms. In one embodiment, a quantity ranging from about 0.1 to about 0.5 millimole of an organic hydroperoxide per mole of monomer and a quantity of a diene sulfone adduct sufficient to yield approximately twice an amount of sulfur dioxide molecularly equivalent to the hydroperoxide can be added to an alkyl methacrylate monomer and the resultant monomer mix held for more than sixteen hours at any temperature up to about 70° C. without causing any appreciable polymerization. Optionally, fillers, fibers, stabilizers, dyes, pigments and other non-polymerizable materials can also be added along with the catalyst and accelerator substance. When desired, the monomer mix can then be cast into a mold maintained at 90 or 100° C. Polymerization will proceed smoothly to produce a finished sheet up to ½ inch or more in thickness in less than two hours. If a large quantity of filler with a relatively large heat capacity, e.g. 20% by volume inorganic mineral, is used, it is possible to shorten the polymerization time to 10 minutes or less.

Incorporation of a filler such as suggested above is often preceded by treatment of the filler with an organosilane capable of adhering to the filler surface. Silane treatment enhances the dispersing capability of the filler and thereby promotes better distribution of filler through the finished composition. The silane can also be selected to provide increased adherence of the silane-treated filler to the polymer. Both increased filler dispersion in the matrix and increased filler adhesion to the polymer can be obtained by using a silane of the formula

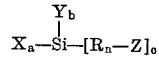

where X is a filler-reactive group such as a halogen or alkoxy group, Y is a non-reactive group such as a hydrocarbyl group, Z is a group capable of interpolymerization with a vinyl monomer such as a vinyl, allyl or methacryloxy group, R is an alkylene group having as many as 20 carbon atoms, $n$ is an integer from 0 to 1, $a$ is an integer from 1 to 3, $b$ is an integer from 0 to 2, $c$ is an integer from 1 to 3, and the sum of $a+b+c$ is 4.

The present invention will be more fully understood in view of the following detailed examples which set forth some suitable accelerator substances, polymer systems and polymeribzation conditions. Parts expressed below are parts by weight unless otherwise specifically stated.

Example 1

To 32 parts of styrene and 16 parts of acrylonitrile in a vessel are added 2 parts of cumene hydroperoxide, 8 parts of a crystalline zeolite which contains absorbed sulfur dioxide and 100 parts of wollastonite which has been pretreated with 0.25 part of 3-trimethoxysilypropyl methacrylate. The sulfur dioxide is present in such quantity on the zeolite that an amount molecularly equivalent to the hydroperoxide is released upon heating the monomer mixture to 50° C. and holding at this temperature for at least 20 minutes. The monomer mixture is held at room temperature for six hours and is then poured into cylindrical molds preheated to 40° C. The mold temperature is gradually raised to 65° C. over a 30 minute period as the molds are rotated about their longitudinal axis on heated rolls. At the end of the thirty minute period, the castings shaped in the form of hollow tubes are removed from the molds. The tubes are of good quality, hard, strong and free from pits, bubbles, fissures and any appreciable amount of unreacted monomer.

Example 2

To 52 parts of styrene and 49 parts of maleic anhydride in a vessel are added 3 parts of cumene hydroperoxide, 3.25 parts of potassium thiocyanate sulfur dioxide addition compound, $KSCN \cdot SO_2$, and 100 parts of a mixture of mullite and quartz, both of which have been pretreated with 0.25% 3-trimethoxysilylpropyl methacrylate. The monomer mixture is held at 55° C in a closed vessel for four hours and then cast into sheet molds spaced 0.25 inch apart and preheated to 75° C. In 25 minutes, the molds are opened and the finished articles removed. The articles are smooth and blemish free and contain no appreciable unpolymerized monomer.

Example 3

To 100 parts of methyl methacrylate is added 200 parts of a mixture of wollastonite and mullite, both of which are pretreated with 0.25% 3-trimethoxysilylpropyl methacrylate. To this mixture is added 7 parts of an unsaturated crosslinking rubber (Hycar 1053), 1 part of cumene hydroperoxide and 3 parts of 2,5-dihydrothiophene-1, 1-dioxide (butadiene-sulfone adduct). The mixture is held at 40° C. for sixteen hours and is then cast into a sheet mold 0.25 inch thick which has been preheated to 90° C. After a 20 minute polymerization, time, the mold is opened and the finished article removed. The sheet is smooth, rigid and of excellent appearance free from pits, bubbles, cracks and any appreciable amount of unreacted monomer.

Example 4

The procedure described in Example 3 is repeated except that the inorganic material and rubbery polymer are omitted and the monomer system is cast into a 3/16 inch thick sheet mold. After a 20 minute polymerization time, the mold is opened and a clear, blemish-free sheet of polymethyl methacrylate is revealed. The sheet has physical, mechanical and chemical characteristics in all ways comparable to the best polymethyl methacrylate sheet that can be prepared using conventional 12 to 20 hour polymerization times.

What is claimed is:
1. A process for polymerizing ethylenically unsaturated monomers by a free radical mechanism comprising
   (a) mixing together an ethylenically unsaturated monomer capable of free-radical polymerization, a polymerization catalyst capable of decomposing to form free radicals, and an accelerator substance of the formula

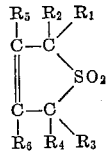

where the R's are hydrogen, alkyl, aryl, or alkaryl groups,
   (b) releasing sulfur dioxide from said accelerator substance and thereby accelerating the formation of free radicals from said polymerization catalyst, and
   (c) polymerizing said ethylenically unsaturated monomer in the presence of said free radicals in a bulk polymerization.
2. A process according to claim 1 wherein said ethylenically unsaturated monomer is an acrylic monomer.
3. A process according to claim 1 wherein said ethylenically unsaturated monomer is a alkyl methacrylate.
4. A process according to claim 1 wherein said catalyst is substantially inactive in the absence of free sulfur dioxide.
5. A process according to claim 1 wherein said catalyst is an organic hydroperoxide.
6. A process according to claim 1 wherein said accelerator substance is 3-sulfolene.
7. A process according to claim 1 wherein a nonpolymerizable filler is added to the monomer-catalyst-accelerator mixture before the onset of polymerization.
8. A process according to claim 7 wherein said filler is treated with an organosilane to promote increased filler dispersion in the polymer and increased filler adhesion to the polymer.
9. A process for polymerizing an alkyl methacrylate comprising
   (a) mixing together an alkyl methacrylate, an organic hydroperoxide, and a diene sulfone of the formula

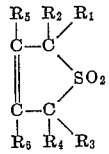

where the R's are hydrogen, alkyl, aryl or alkaryl groups having up to eight carbon atoms,
   (b) releasing $SO_2$ from said diene sulfone adduct, thereby accelerating the formation of free radicals from the organic hydroperoxide, and
   (c) polymerizing said alkyl methacrylate in the presence of said free radicals in a bulk polymerization.
10. A process according to claim 9 wherein said R's are hydrogen.
11. A process according to claim 9 wherein a nonpolymerizable filler is added to the methacrylate-hydroperoxide-diene sulfone mixture before the onset of polymerization.
12. A process according to claim 9 wherein said filler is treated with an organosilane to promote increased filler dispersion in the polymer and increased filler adhesion to the polymer.

References Cited

UNITED STATES PATENTS 3,255,164  6/1966  Visger et al.
3,265,675  8/1966  Hagemeyer et al.

OTHER REFERENCES

Chemical Abstracts, volume 31, column 18198a.
Union Carbide Corporation Bulletin, Molecular Sieve Products, Mar. 10, 1961.

MORRIS LIEBMAN, *Primary Examiner.*

SAMUEL L. FOX, *Assistant Examiner.*

U.S. Cl. X.R.

260—85.5, 879, 86.1, 78.5

PO-1050
(5/69)

UNITED STATES PATENT OFFICE
CERTIFICATE OF CORRECTION

Patent No. 3,448,073          Dated June 3, 1969

Inventor(s)    Robert J. McManimie

It is certified that error appears in the above-identified patent and that said Letters Patent are hereby corrected as shown below:

Column 2, line 39, "jctive" should read--jective--. Column 3, line 48, "of monomer" should read--of the monomer--. Column 4, line 33, "hepaldehyde" should read--heptaldehyde--. Column 6, line 9, "$R_5\ R_3\ R_3$" should read --$R_5\ R_4\ R_3$ --. Column 6, line 55, "polymeribzation" should read--polymerization--. Column 6, line 62, "adserbed" should read --adsorbed--.

SIGNED AND
SEALED

SEP 2 - 1969

(SEAL)
Attest:

Edward M. Fletcher, Jr.
Attesting Officer

WILLIAM E. SCHUYLER, JR.
Commissioner of Patents